United States Patent [19]

Nutter et al.

[11] Patent Number: 5,037,159

[45] Date of Patent: Aug. 6, 1991

[54] APPARATUS FOR COLLECTING AND PACKAGING HAZARDOUS PARTICULATE MATERIALS

[76] Inventors: Victor H. Nutter, R.D. 2, Flower Rd., Hopewell Junction, N.Y. 12533; Howard G. Baker, R.D. 1, Portersville, Pa. 16057; Sheldon Lefkowitz, 119 Lang Dr., Coraopolis, Pa. 15108

[21] Appl. No.: 504,537

[22] Filed: Apr. 4, 1990

Related U.S. Application Data

[60] Division of Ser. No. 292,543, Dec. 30, 1988, Pat. No. 4,969,311, which is a continuation-in-part of Ser. No. 115,780, Oct. 30, 1987, abandoned.

[51] Int. Cl.[5] ........................ A47L 9/00; B01D 45/12; B25D 17/32

[52] U.S. Cl. ........................................ 299/37; 15/352; 55/429; 299/64

[58] Field of Search .................... 53/432, 471; 15/352, 15/353, 340.1; 55/429, 432, DIG. 9; 134/21, 25.4; 299/37, 64, 67

[56] References Cited

U.S. PATENT DOCUMENTS 4,227,893 10/1980 Shaddock ...................... 15/340.1 X
4,509,963 4/1985 Jackson .......................... 15/340.1 X
4,940,289 7/1990 Trovato et al. ....................... 299/37
4,963,172 10/1990 DeMarco ............................ 55/429

FOREIGN PATENT DOCUMENTS 1507868 3/1973 Fed. Rep. of Germany ... 55/DIG. 9
3723148 1/1989 Fed. Rep. of Germany ..... 15/340.1
273 1/1979 Japan .................................... 55/429
2141328 12/1984 United Kingdom .................. 15/352

*Primary Examiner*—Ramon S. Britts
*Assistant Examiner*—David J. Bagnell
*Attorney, Agent, or Firm*—Brooks Haidt Haffner & Delahunty

[57] ABSTRACT

A method and apparatus is described for vacuum collecting and packaging of particulate materials, such as hazardous radiation contaminated concrete dust generated by floor scabbling, which avoids release of even small quantities of the material into the surrounding air. Each drum is positioned with its open mouth rim closely adjacent to the downwardly facing material-outlet of the vacuum collecting system. In one of the embodiments, an inflatable sealing gasket seals the spacing therebetween during filling. In another embodiment, the vacuum collecting system is vertically movable, and the vacuum collecting head, with a non-inflatable gasket is moved into engagement with the drum to provide the seal during filling. When filled, deflation of the gasket or vertical movement of the vacuum head again provides the narrow spacing, and both the container lid and a cover for the material outlet are passed therethrough. The material outlet cover is held against the outlet by vacuum while the filled container is covered and replaced with an empty container. The disposable cover is then dropped into the second container after it has been similarly sealed to the vacuum system for filling.

9 Claims, 5 Drawing Sheets

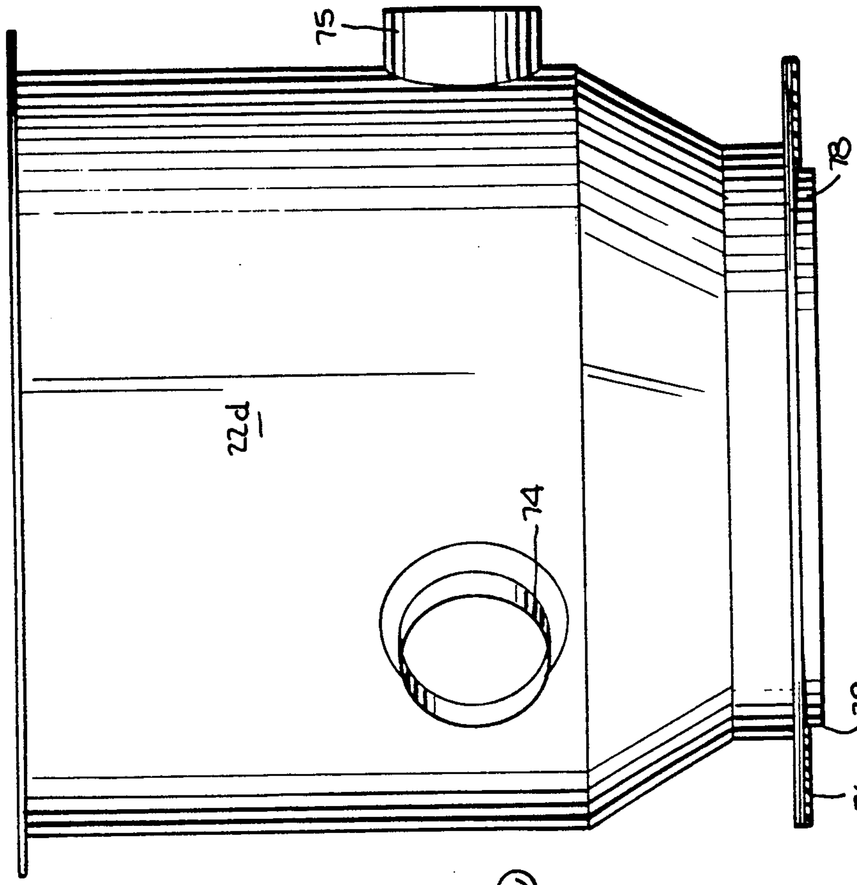
Fig. 8.
Fig. 7.
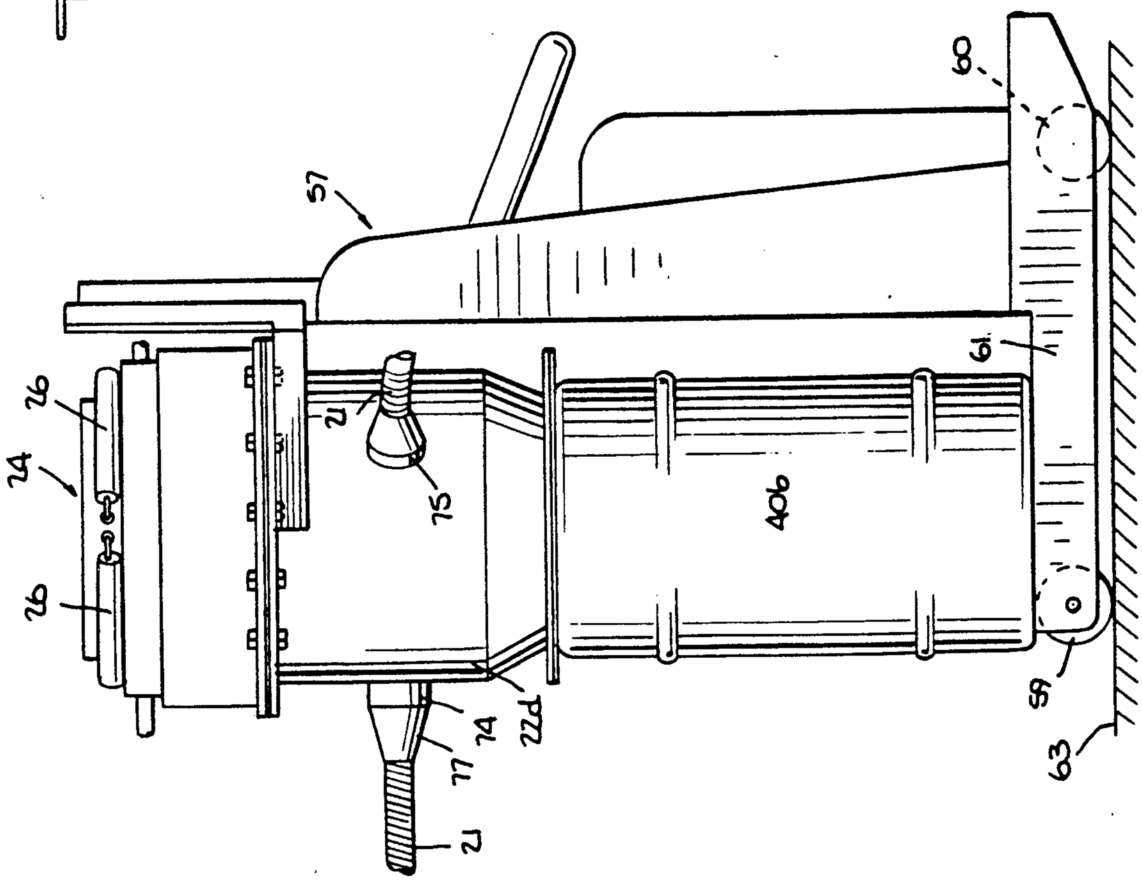

APPARATUS FOR COLLECTING AND PACKAGING HAZARDOUS PARTICULATE MATERIALS

This is a division of application Ser. No. 292,543, filed Dec. 30, 1988, now U.S. Pat. No. 4,969,311 which application is a continuation-in-part of copending application Ser. No. 07/115,780 filed Oct. 30, 1987 and entitled "Collecting and Packaging Hazardous Particulate Materials" now abandoned.

FIELD OF THE INVENTION

This invention relates to techniques for the vacuum collecting and packaging of hazardous particulate materials, such as radiation or chemically contaminated dust or other dust injurious to humans. More particularly, the invention relates to methods and apparatus for safely depositing and sealing the collected particulate material in containers.

BACKGROUND OF THE INVENTION AND THE PRIOR ART

Although it may have other uses, the invention was made during attempts to improve the performance of a dust collecting vacuum device used for decontaminating concrete floor surface areas within the containment of a nuclear power plant and will therefore be described in connection with such use.

When surface coatings and other deposits on concrete floors must be removed, or the floor needs resurfacing, it is common to remove anywhere from 1/32" to 3/16" of the thickness of the floor surface by scabbling using hand tools, or preferably, a mobile vehicle on which a scabbling head is mounted. The scabbling of the surface pulverizes the concrete to that depth by rapidly repeated hammer blows of the scabbler pistons which are driven by compressed air and carry tungsten carbide tipped bits. Such pulverizing would produce airborne dust, injurious particularly to the operators of the vehicle, were it not collected by an efficient vacuuming system as it is produced. In nuclear power plants, such scabbling is used to remove radiation-contaminated floor coatings, and it is apparent that the created dust is extremely hazardous. If not efficiently and safely removed, the floor-scraping personnel and others within the area will be subjected to harmful radiation.

Considering the dangerous environment, a remotely operated scabbler vehicle has been devised having an efficient vacuum collection system thereon for removal and temporary storage of the generated dust in a waste bin also mounted on the vehicle. This self-powered and skid-steered six-wheel vehicle is available from Pentek, Inc. of Pittsburgh, Pa., under the trademark "The MOOSE". However, the on-board waste bin must be emptied when filled, which unavoidably causes release of at least some contaminated dust into the surrounding air, which prevents the desired complete decontamination of the area being cleaned.

OBJECTS AND BRIEF SUMMARY OF THE INVENTION

Accordingly, it is intended by the present invention to provide a system for vacuum collecting and directly packaging particulate material or dust, particularly hazardous material or dust, within an easily removable and sealable container for convenient disposal. The container is preferably itself disposable for the purpose.

Further, it is intended that virtually none of the collected hazardous dust will be released into the surrounding air either during its travel from the vacuum system into the container, or upon or after removing the filler container.

The invention provides a vacuum system for collecting and depositing particulate material or dust in a container which system may be positioned over the container, or under which system the container may be positioned, and a method and apparatus for sealing the vacuum apparatus and sealing the container after it is filled, or partly filled, with such material or dust, so as to prevent such material or dust from being released to the atmosphere during the removal of the container.

The invention also contemplates replacement of the conventional waste bin on "The MOOSE"* mobile scabbler or any similar vehicle by a system utilizing such readily-sealable and removable containers in a manner which similarly avoids release of the dust into the atmosphere. As a result, the utility of such a conventional scabbler vehicle will be enhanced.

Thus, the invention will provide a safe and convenient system and technique for the vacuum collecting and packaging of hazardous dust or particulate material in sealed, disposable containers.

Briefly describing the invention in one embodiment the conventional waste storage bin and its attached vacuum system are removed from The MOOSE scabbler vehicle and replaced by a suspended vacuum system whose bell-shaped bottom filter chamber has a downwardly facing opening which serves as the outlet for the collected dust. An inflatable sealing gasket is attached about the periphery of the dust outlet, for expansion into dust-sealing engagement with the mouth rim of a removable dust collection container appropriately positioned therebelow.

In a second embodiment, the vacuum system is suspended from the vertically movable arms of a conventional fork lift truck modified to receive the vacuum system. Normally, such truck has a pair of forwardly extending legs below the arms. If the truck has wheels, the vacuum system may be positioned over the container, on a pallet or the floor, by appropriate movement of the truck. Alternatively the container may be positioned under the outlet of the vacuum system by moving the container under the outlet, on a pallet or otherwise, and the container, if smaller in width than the spacing between the legs, can rest on the pallet, the floor or if wider than the spacing between the legs, can rest on the legs.

It is apparent that, upon inflating the inflatable seal, the container may be filled with dust by operation of the vacuum system, without risk that the dust passing through the vacuum system dust outlet and into the container may be released into the surrounding air. However, without more, it is believed likely that some hazardous dust will be released uncontrollably after the sealing gasket has been deflated and while or after the filled but open-topped container is removed, and during the subsequent positioning of another empty container beneath the dust outlet of the vacuum. That is, hazardous dust which has accumulated on interior surfaces within the vacuum head may be shaken loose by bumping of the container or otherwise and dropped through the open dust outlet as the containers are interchanged.

Accordingly, in accordance with the invention, each container is accurately positioned beneath the vacuum system filter chamber with its upwardly facing open mouth in very closely spaced relationship with the intended comating periphery of the aforementioned inflatable sealing gasket. However, the spacing is such as will permit the substantially flat, though rimmed container lid to pass therethrough and be positioned in covering relation on a filled container when the seal is deflated, and while the container remains in its position beneath the vacuum chamber.

A thin but rigid and flat cover for the vacuum system dust outlet opening is also passed through the narrow spacing, preferably with the container lid, and positioned immediately beneath the inflatable sealing gasket when a filled container is to be removed. The periphery of the dust outlet cover is smaller than the periphery of the mouth of the container, for a purpose as will be described, and the sealing gasket has a correspondingly sized inner peripheral portion or lip against which the dust outlet cover may seat.

When a container being filled with the hazardous dust material has reached its capacity and is to be removed, the scabbling operation is stopped and the vacuum system is throttled back, thus stopping the flow of the dust being collected while permitting a small negative pressure to remain within the vacuum head. The inflated gasket seal is then deflated to open the referred to narrow spacing between the filled container mouth and the gasket periphery. The flat dust outlet cover is first placed and centered on the top of the flanged container lid and the two, together, are carefully passed in horizontal direction through the narrow spacing to position the lid on the container. The dust outlet cover is concurrently positioned immediately beneath the deflated sealing gasket, its periphery being in vertical alignment with the referred to inner peripheral seating portion or lip of the gasket. The container lid is positioned firmly on the filled container, with the respective lid sealing surfaces thereof in firm contact. With some manual assistance the small negative pressure within the still throttled back vacuum system is effective to lift the dust outlet cover off the container lid and to automatically seat and hold it against the still deflated gasket. With the vacuum system continuing in operation, the now covered, filled container may be safely removed from beneath the vacuum head without risk that contaminated dust may fall from the head, or otherwise be released into the atmosphere, because the otherwise exposed interior surfaces of the vacuum head and filter chamber are now covered and sealed by the dust outlet cover. A conventional sealing ring is then placed and tightened to seal the lid on the waste container.

Although the waste filled container might be removed and an empty container might be positioned from a different direction, such as by vertical movement, in the preferred embodiment the containers are moved laterally into and away from their positions beneath the vacuum head. For that purpose the scabbler vehicle is provided with a laterally slidable platform or bed on which the containers are placed. For accurate positioning of the containers thereon, the platform is provided with appropriate positioning devices, such as bumper stops. Of course, the slidable platform itself moves against a stop when a container thereon is being placed beneath the vacuum head, so that accurate positioning of the container is assured.

When an empty container has been so positioned beneath the vacuum head for filling, the still deflated gasket seal is inflated into sealing engagement with the mouth rim of the empty container. The vacuum pressure of the still operating vacuum system is then decreased, or briefly discontinued, whereupon the expendable vacuum system dust outlet cover will fall from its engagement with the gasket and into the empty container for disposal therewith after the container has been filled upon adjustment or recommencement of vacuum system operation.

Although the inflatable gasket described hereinbefore can be used with the second embodiment described hereinbefore and the procedure described hereinbefore can be used, an inflatable gasket is not required in the second embodiment since the vacuum system can be raised or lowered with respect to the container so as to provide the spacing or closing of the space between the outlet of the vacuum system and the mouth of the container. Thus, the inflatable gasket can be replaced by a non-inflatable gasket, but otherwise, the sealing and removal steps are the same except for replacement of movement of the inflatable gasket by relative vertical movement of the vacuum system and the container.

DETAILED DESCRIPTION OF THE PREFERRED EMBODIMENTS

These and other objects, features and advantages of the invention will be readily apparent from the following detailed description thereof, which makes reference to the accompanying drawings in which:

FIG. 7 is a side elevation view of a further embodiment of the invention; and FIG. 8 is an enlarged, side elevation view of the modified plenum chamber employed in the vacuum system of the embodiment shown in FIG. 7.

Figure 1:
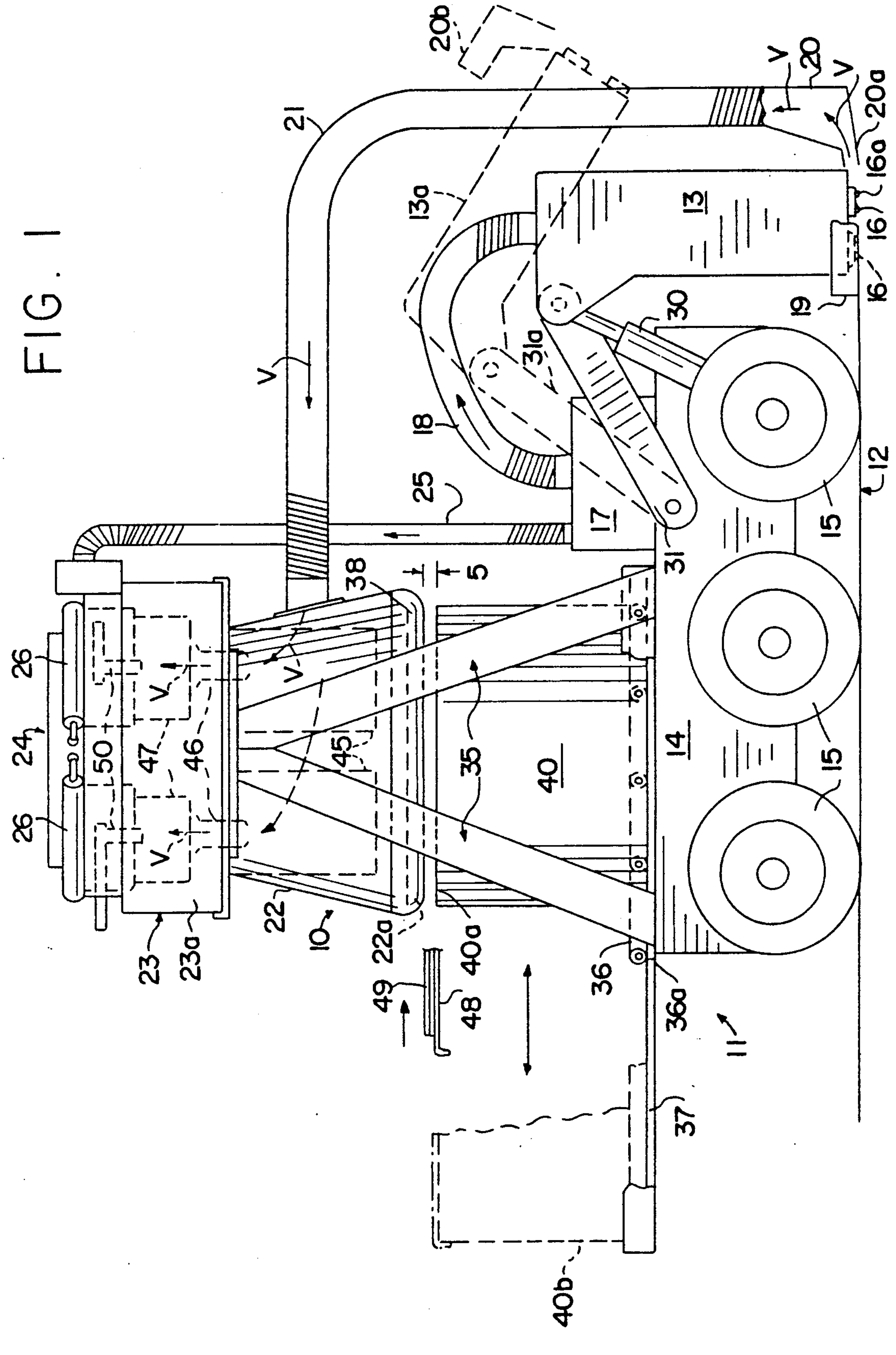
FIG. 1 is a diagrammatic illustration of a mobile floor scabbling vehicle for use in practising the present invention, the retracted position of the scabbling head and other features being shown in dotted lines.

The general arrangement and operation of the system of collecting and packaging hazardous particulate material in accordance with the invention is best understood with reference to FIG. 1, which is a diagrammatic illustration of the system 10 mounted on "The MOOSE" mobile scabbling vehicle, generally indicated by reference numeral 11. The electrically powered vehicle 11 is used to scabble and pulverize only a thin surface portion of a concrete floor 12 using its scabbling head 13, as is a conventional operation. In nuclear power plants, the scabbler vehicle 11 is used to decontaminate such floor surfaces as may have radiation-contaminated surface coatings thereon, as is also known. The vehicle body 14 is mounted on six wheels 15, only three of which are seen, and may be skid-steerable in a conventional manner.

As the vehicle travels, the scabbling operation is performed by rapid, reciprocating action of seven scabbler pistons 16 (only two of which are shown) having tungsten carbide bits 16a thereon, which are mounted vertically within, and in appropriately spaced relation extending across the scabbler head 13. The movement of scabbler pistons 16 is powered by compressed air generated by the air compressor 17 and delivered to the scabbler head 13 via a flexible compressed air line 18, as indicated by the arrowhead thereon. The contaminated concrete dust generated at the bottom of the scabbler head is shielded, as by shields 19 (only one of which is shown), and diverted towards the vacuum collection head 20, the inlet end 20a of which is closely adjacent to, and spans across the width of the scabbler head 13. The vacuum system, as will be described, draws the generated dust or particulate material in the direction of the arrows V into the collection head 20, and thence through the flexible vacuum line 21 into the bell-shaped, vacuum head bottom chamber 22, which is an integral part of the vacuum head generally indicated by reference numeral 23.

Such a conventional scabbling vehicle typically scabbles a path 18" wide, corresponding to the width of the scabbling head 13, and is capable of up to 800 sq. ft. per hour of concrete surface removal at a cutting depth of 1/32". Of course, the removal depth may be adjusted in increments of from 1/32" to 3/16". The seven tungsten carbide tipped pistons 16 are each 2¼" in diameter, and together deliver 1,200 blows per minute, with 12 ft.-lbs. of energy being delivered per blow. To remove the generated dust using a pneumatically driven vacuum system as incorporated in the vacuum head 23, the system must provide nominal vacuum flow capacity of 150 scfm. The vacuum system is pneumatically powered by air delivered from the air compressor 17 through the compressed air line 25, in the direction of the arrow thereon, to a series of nine air eductors, only two of which are shown and indicated by reference numeral 26, and which are mounted atop the vacuum head 23. Typically, compressed air delivered via the line 25 at 80 psig to the eductors 26 will generate a maximum 250 scfm of vacuum in the system.

When the scabbling operation is complete, or when filled containers are to be removed as will be later described, the scabbling head 13 may be raised by actuation of the pneumatic cylinder 30, which pivots the mounting arm 31 to its dotted line position 31a, thereby raising the scabbler head 13 to its dotted line position 13a carrying the dust collection head 20, which is attached thereto, to its dotted line position 20b.

Referring now to the vacuum collecting and packaging system of the invention as shown in FIG. 1, the vacuum head 23, carrying its attached lower chamber 22, is mounted on a pair of steel A-frame supports 35, one on either side of the vehicle body 14 (only one being seen in FIG. 1), with the chamber 22 disposed and suspended therebetween. In the arrangement being described the chamber 22 is circular in cross-section, and has its downwardly facing, dust material outlet opening periphery 22a disposed at a fixed height above the level of a horizontally slidable bed 36 mounted on the vehicle body 14. This fixed distance above the slidable bed 36 is pre-determined to provide only a narrow-height, horizontally extending spacing S between the periphery 22a of the chamber 22 and the upwardly facing open mouth rim 40a of a cylindrical drum or container 40 positioned therebelow on the slidable bed 36 for receiving and packaging the collected dust being generated at the scabbling head 13.

Operation of the pneumatically operated vacuum system, generally indicated by reference numeral 24, draws the dust-containing air from the scabbler in the direction of arrow V within the vacuum line 21 and into the lower chamber 22 where it passes through roughing-filters 45 which are mounted therein. The draw path courses upwardly through the roughing-filter purge openings 46 into the upper vacuum chamber 23a, and thence through HEPA filters 47 by which the vacuum air is finally cleansed of 99.97% of all particulates above 0.3 microns in size. The vacuum exhausts through the vacuum eductors 26, as is well known. During operation of the system, the filtered out hazardous dust material collects on and around the filters and otherwise within the vacuum head 23, and falls through the dust material outlet 22a directly into the open-topped drum or packaging container 40.

The slidable bed 36 is roller mounted, as by rollers 36a, on horizontally extending tracks 37 which are attached to the vehicle body 14, as shown. Thus, containers 40 positioned on the slidable bed 36 are conveniently moved laterally, as indicated by the arrow, from under the vacuum head 23 for removal from the vehicle 11 at the dotted line position 40b thereof.

Were the scabbling operation and vacuum system 24 to be operated with the container 40 in its full-lined position beneath the vacuum head 23, and were the spacing S permitted to remain as shown in FIG. 1, it is apparent that at least some of the collected and falling hazardous dust material may escape from the system through the spacing S into the surrounding atmosphere. Moreover, even after shutting off the scabbling and vacuum systems, the removal of a filled container 40 from beneath the vacuum head 23 may jar the head 23, causing release of more hazardous dust therefrom through the material-outlet 22a of the vacuum system even after purging the filters using compressed air from filter purgers 50.

Figure 2:
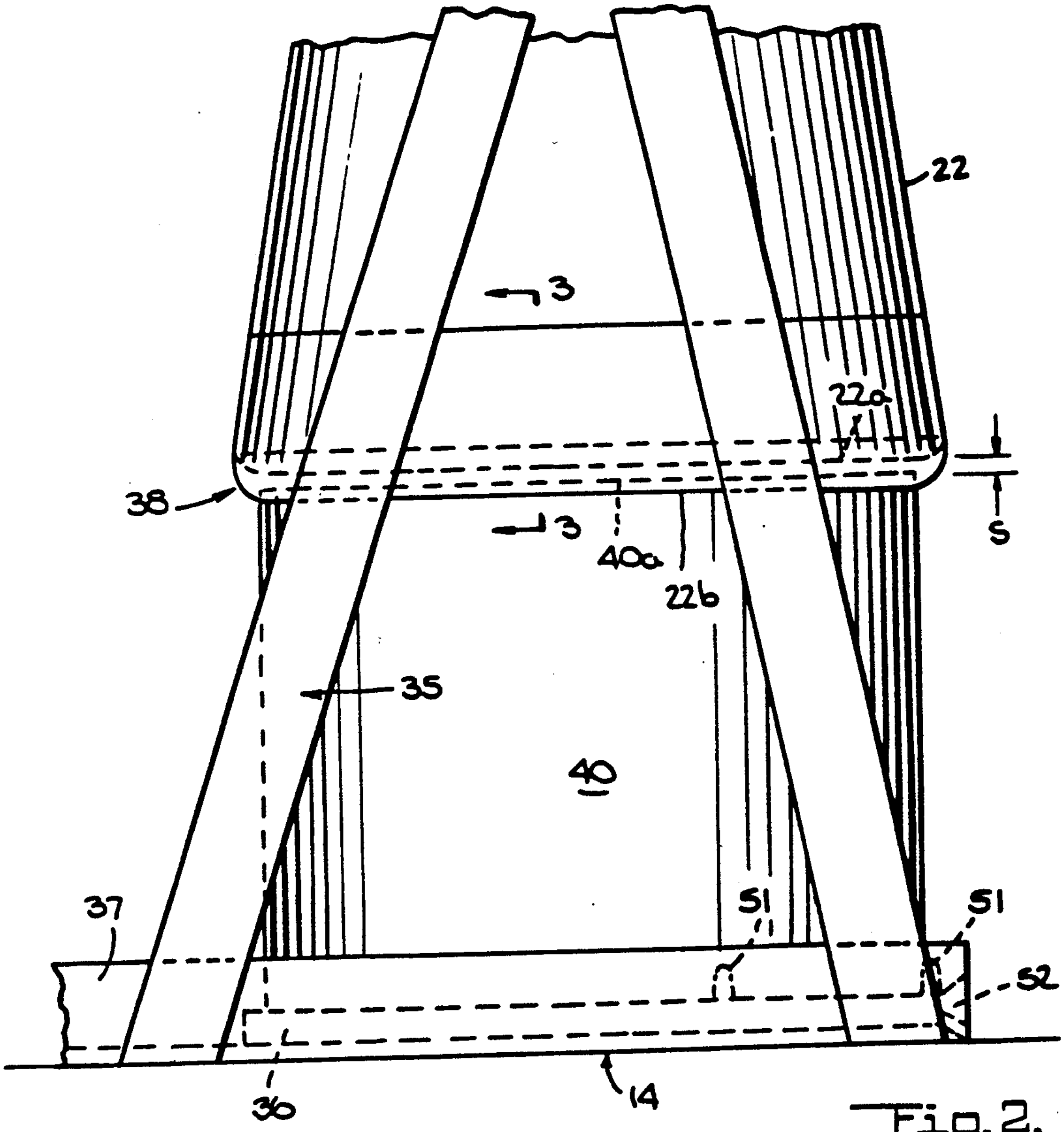
FIG. 2 is an enlarged fragmentary and diagrammatic side elevation of the vacuum head lower chamber and the container on the vehicle shown in FIG. 1, to illustrate the contemplated seal engagement between them during filling of the container.
Figure 3:
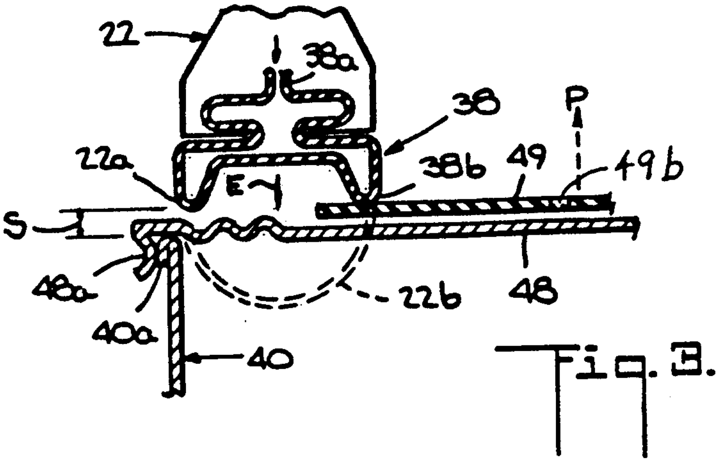
FIG. 3 is a further enlarged and fragmentary cross-sectional view as seen from lines 3—3 in FIG. 2, showing in detail the positional relationships between the vacuum head and the container.

Accordingly, and referring now to FIGS. 2 and 3, in accordance with the invention the narrow spacing S is temporarily closed and sealed before and during the filling of container 40 with the hazardous dust material, by expanding a peripherally extending inflatable rubber sealing gasket 38, attached to the chamber 22, into dust-sealing engagement with the open mouth rim 40a of the container 40, as illustrated in FIG. 2 and in dotted lines in FIG. 3. As indicated in FIG. 3, the gasket 38 is inflated through the air line opening 38a using air from air compressor 17. Expansion of the gasket 38 proceeds in the direction of the dotted line arrow E until the chamber periphery 22a has moved to the dotted line, expanded position 22b in sealing engagement against the interior of container rim 40a. None of the contaminated dust can escape through the sealed interface, and the container filling operation is conducted very safely.

According to the invention, after the container 40 (FIG. 2) has been filled, the scabbling operation is stopped and the head 13 is raised to its inactive position 13a. The operation of the vacuum system 24 is throttled back to reduce, but not eliminate, the negative pressure within the vacuum head 23, and the inflated sealing gasket 38 is deflated by releasing the compressed air therein via the air line opening 38a (FIG. 3). The gasket 38 thus returns from its inflated condition, as illustrated in FIG. 2 and by dotted lines 22*b* in FIG. 3, to its normal, or deflated condition as shown in full lines in FIG. 3. The relative positions and relations between the vacuum head 23 and the now filled container 40 are then as shown in FIG. 1, with the narrow spacing S again being provided between the open, upper mouth rim 40*a* of the container and the bottom periphery 22*a* of the lower chamber 22, the reference numeral 22*a* also indicating the lower extremity of the deflated gasket 38. It is assumed that some radiation-contaminated dust remains within the vacuum head 23, being deposited on filters 45 and 47 and on other interior surface areas, even after purging as aforesaid before opening the seal 38. This hazardous material must be retained within the head, yet the filled container 40 must be removed from beneath the vacuum head 23 and replaced by an empty container to continue the vacuum collecting and packaging of the scabbled dust material. Accordingly, the reduced vacuum pressure remaining in the head when the seal is opened draws ambient air through the spacing S and into the head, to retain the residue therein.

The narrow spacing S (FIGS. 1 and 3) has a height as small as possible, yet just sufficient to permit sliding passage therethrough of the container lid 48 into its position over the container rim 40*a* covering the container 40, and of a thin and flat, but rigid cover 49 for covering the material-outlet 22*a* of the vacuum head if the cover 49 will be positioned concurrently with the placement of the container lid 48 as is preferred and illustrated in FIG. 1. If positioned concurrently, the cover 49 may be disposed within a top recess of the lid 48 during the procedure as indicated in FIG. 3. Of course, the lid 48 might be passed through the spacing S and positioned on the container 40 first, after which the material-outlet cover 49 may be passed through the spacing S to its position resting on the container lid 48 as illustrated in FIG. 3, in which case the spacing S might be made slightly smaller.

The vacuum system material-outlet cover 49 is made of disposable material, such as particleboard or plastic or the like, so that it is only about ¼" in thickness, or preferably less. In the embodiment being described wherein the outlet periphery 22*a* is circular in shape and the container 40 is a cylindrical drum, the diameter of the thin but rigid cover 49 is made slightly larger than the diameter of the inner surface portion or lip 38*b* formed by the deflated sealing gasket 38, yet smaller than the inside diameter of the container 40 as illustrated in FIG. 3.

After carefully passing the container lid 48 through the spacing S into covering relationship on the container 40 and the cover 49 has been similarly positioned in alignment with and beneath the material outlet, the vacuum pressure in the system 24 is increased, but the scabbler head 13 remains in its raised position as indicated at 13*a* (FIG. 1) so that no further dust will be introduced into the vacuum head 23. With only minor manual assistance by initially lifting an end of the cover, the negative pressure P created is sufficient to lift the cover 49 upwardly from its position resting on the lid 48 and into sealing engagement with the peripherally extending inner lip 38*b* of the deflated sealing gasket 38, as illustrated in FIG. 3. The weight of the lid 48 is sufficient so that it does not respond to the lifting force, and remains in its position covering the container 40. The vacuum system 24 continues to be operated, so that the cover 49 continues in sealing engagement with the lip 38*b* to close the vacuum system material-outlet at the bottom of the lower chamber 22, and thus prevent any dislodged contaminated dust falling within the lower chamber 22 from being released into the surrounding atmosphere via the narrow spacing S.

With the vacuum system 24 operated as described so that the material-outlet cover 49 remains in place, the container lid 48 may be carefully pressed downwardly so that its rim flange 48*a* (FIG. 3) engages beneath the rolled rim 40*a* of the drum 40. The sliding bed 36, with the filled container thereon, is carefully rolled along the tracks 37 to remove the container from beneath the vacuum head 23 in the direction of the left-hand arrowhead in FIG. 1 to the dotted line position 40*b*. At this location a conventional lid sealing ring (not shown) is tightened around the lid flange 48*a* to seal its engagement with the container rim 40*a*, so that none of the contained contaminated dust can be released from the container. The filled and capped container may then be removed from the tracks 37 for appropriate disposal.

A second empty container is then placed on the sliding bed 36 in the position indicated by reference numeral 40*b* in FIG. 1, whereupon the sliding bed is rolled on rollers 36*a* along the tracks 37, in the direction of the right-hand arrowhead, into the described position beneath the vacuum head 23. To ensure accurate positioning, appropriately located centering bumper stops 51 (FIG. 2) are attached on the surface of the sliding bed 36, and the end position of the sliding bed 36 on the tracks 37 is also accurately determined by the bumper stops 52 at the ends of the tracks 37, as also illustrated in FIG. 2.

As will be understood from FIG. 3, the thus positioned, open-topped second container 40 (without any lid 48) may be sealed to the vacuum head 22 by expanding the inflatable gasket 38 to its expanded position 22*b* as seen in FIG. 3. Preferably, the vacuum system 24 continues in operation during this inflating of the gasket 38, to retain the material outlet cover 49 in sealing engagement with the material-outlet from the vacuum system, and thus avoid any possibility that contaminated dust may escape before the container rim seal is formed.

After the inflated sealing gasket 38 is in dust-sealing engagement with the second container rim 40*a* as described, the operation of the vacuum system 24 is momentarily reduced in pressure, or discontinued, whereupon the disposable outlet cover 49 will drop from its engagement with the lip 30*b* (FIG. 3) into the second, empty container 40, to be disposed therewith after the container is filled. The vacuum system 24 is then turned on or adjusted to its nominal working capacity, the scabble head 13 is lowered from its position 13*a* to continue the scabbling operation on the concrete floor 12 (FIG. 1), whereupon the generated contaminated dust is again drawn through the vacuum system 24 and packaged directly into the second container 40, in the manner previously described.

Alternatively, the outlet cover 49 may be provided with a small through-hole 49*b* (see FIG. 3) which is small relative to the area of the face of the cover 49, e.g. ¼ inch in diameter, and which is placed where air can flow from the underside of the cover 49 into the vacuum head bottom chamber 22, and in this case, it is not necessary to reduce or discontinue the vacuum to cause the cover 49 to drop into the empty container 40. Thus, prior to engaging the gasket 38 with the rim 40*a*, the vacuum in the chamber 22 will be sufficient to maintain the cover 49 in sealing engagement with the material outlet even with a small flow of air through the hole 49*b*, but after the gasket 38 engages the rim 40*a*, the pressure at opposite sides of the cover 49 will equalize causing the cover 49 to drop into the empty container 40.

In the preferred embodiment, and in order to limit the height of the vehicle 11 by keeping the height of the vacuum head 23 as low as possible so that the vehicle may pass through doorways, etc., one-half size, fifty-two gallon disposable drums are used as the containers 40, the height of such half-height drums being only about 15½". These drums are filled to within a few inches of their top rims 40*a*, and when thus filled with concrete dust, each weighs about 200 lbs. Further, using appropriate compacting apparatus (not shown), it is found that three such filled, half-height fifty-two gallon drums may be placed within one empty fifty-five gallon steel drum and compacted therein, so that the outer fifty-five gallon drum may be sealed for appropriate disposal.

It is apparent that the vacuum collection and container packaging system 10 need not be mounted on a vehicle, but may be erected in a fixed location, or on a portable dolly or the like, from which lengthy, flexible vacuum hoses may extend for decontamination operations. Further, whether in fixed position or on a vehicle, it is also apparent that the required compressed air for powering the vacuum system may be taken from any standard building source having adequate capacity, and need not be generated by a separate, dedicated air compressor as in the arrangement described in FIGS. 1–3.

Figure 4:
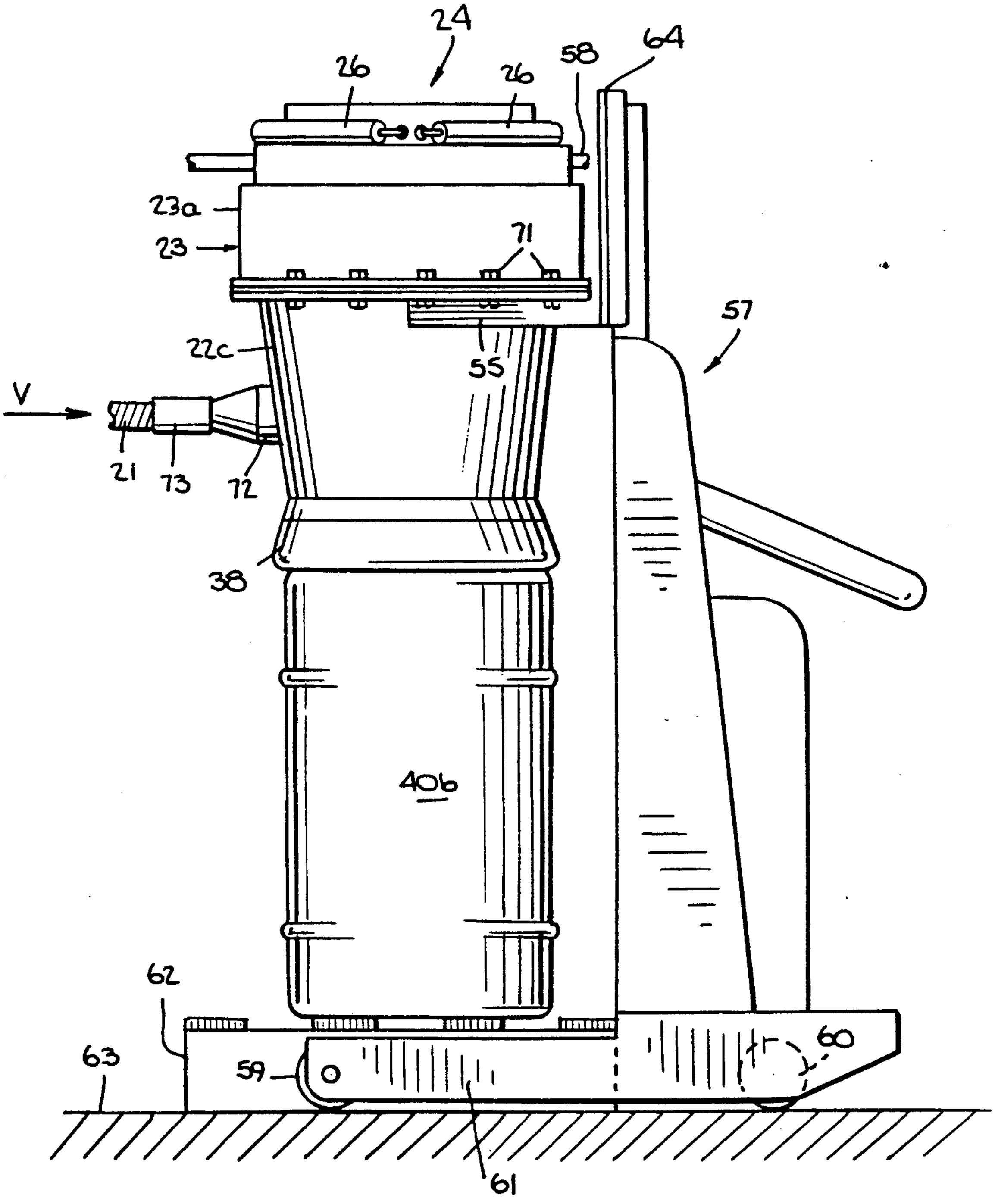
FIG. 4 is a side elevation view of a second embodiment of the invention.

FIG. 4 illustrates an embodiment of the invention in which the vacuum system 24, which is the same as the vacuum system described in connection with preceding figures except for the taper of the metal vacuum head bottom chamber or plenum 22*c*, is mounted on and secured to the vertically movable arms 55 and 56 (see FIGS. 4 and 5) of a modified conventional fork lift vehicle 57, such as a fork lift sold by Big Joe Manufacturing Company, Lincolnwood, Ill. under the designation "Challenger XT". Air under pressure from any desired source is delivered to the eductors 26 through a line 58 for the purposes previously described.

The fork lift vehicle 57 is provided with wheels 59, 60, etc. so that the fork lift vehicle 57 can be moved horizontally to various locations and has a pair of laterally spaced legs, only one of which, 61, is visible in FIG. 4. In the embodiment shown in FIG. 4, the legs are laterally spaced by an amount sufficient to receive a pallet 62 which rests on the floor 63 and which supports a container or drum 40*b*. Thus, the vacuum system 24 may be positioned over the mouth of the drum 40*b* by keeping the pallet 62 and the drum 40*b* stationary and by moving the fork lift vehicle 57 with the vacuum system 24 thereon until it is positioned over the drum 40*b* or by moving the pallet 62 with the drum 40*b* thereon and keeping the fork lift truck stationary, the drum 40*b* may be positioned under the vacuum system 24.

Alternatively, the lateral spacing between the legs may be greater or lesser than the diameter of the drum 40*b*. In the former case, greater spacing, the drum 40*b* can rest on the floor 63 or a pallet, and the drum 40*b* and the fork lift can be positioned relative to each other as previously described. If the legs have a spacing less than the diameter of the drum 40*b*, then, the drum 40*b* can be supported by the legs beneath the vacuum system 24.

Figure 5:
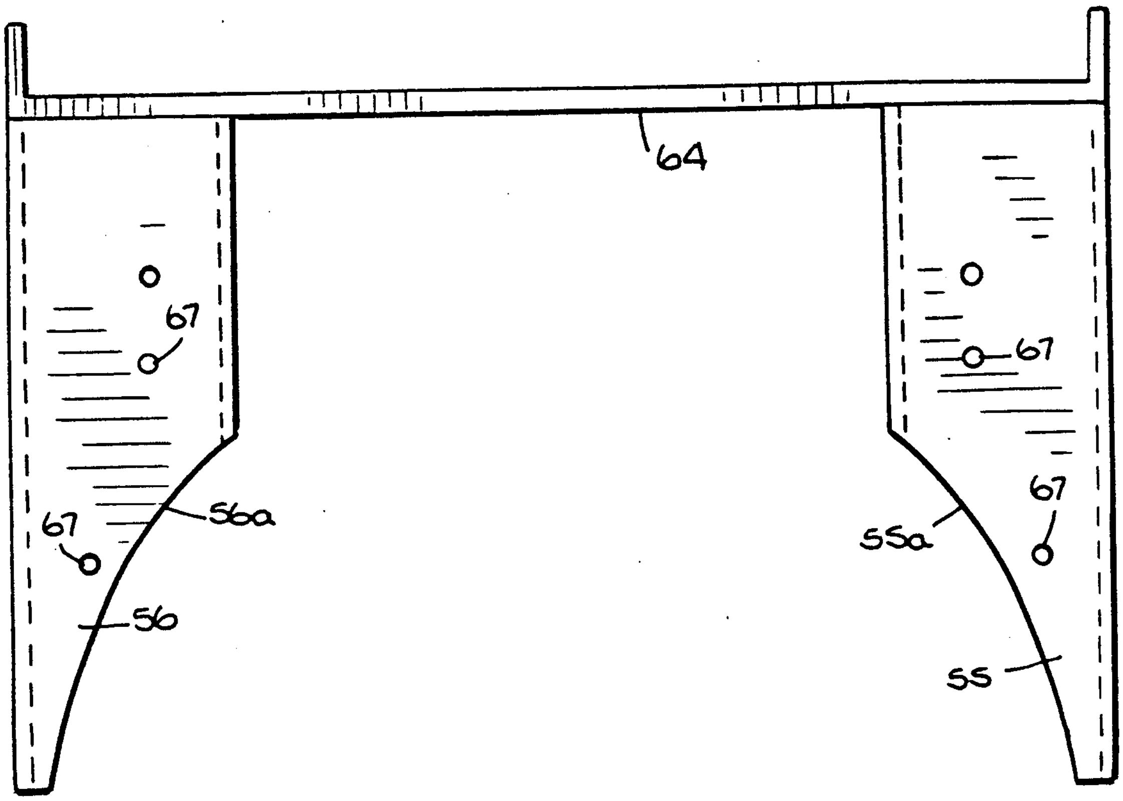
FIGS. 5 and 6 are respectively plan and front views of the fork portion of the lift truck shown in FIG. 4.
Figure 6:
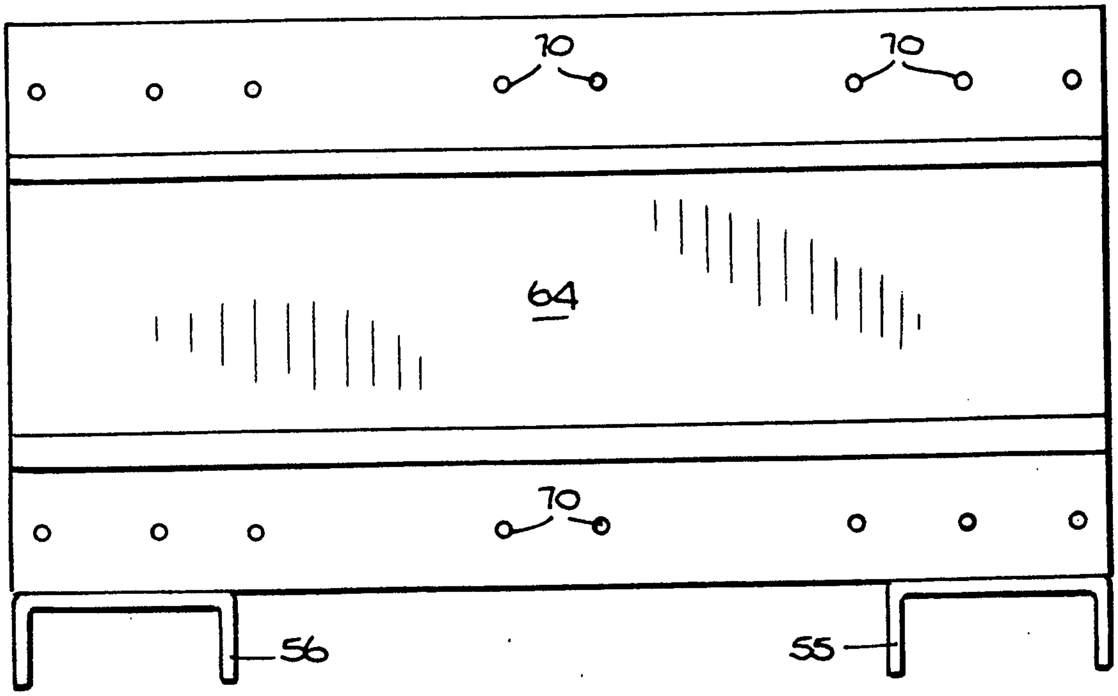

The arms of a conventional fork lift are replaced by the arms 55 and 56 shown in greater detail in FIGS. 5 and 6. Such arms are secured to the plate 64 of the fork lift 57, such as by welding, which plate 64 is vertically driven in a conventional manner. The arms 55 and 56 have arcuate portions 55*a* and 56*a* for partially encircling the plenum 22*c* and have through holes 67 for receiving bolts 71 for securing the flanges 68 and 69 of the upper vacuum chamber 23*a* and the plenum 22*c*, respectively, to the arms 55 and 56. The plate 64 has a plurality of tapped holes, such as the holes 70, for securing various components, such as controls, of the vacuum system to the plate 64.

A hollow, tapered extension 72 is secured to the side of the plenum 22*c* for receiving the vacuum hose 21, the hose 21 being secured to the extension 72 by a sleeve 73.

The operation of the apparatus shown in FIG. 4 for sealing the drum 40*b*, depositing the particles in the drum 40*b* and removal of the drum 40*b* can be the same as that described in connection with FIGS. 1–3, it being observed that there is an inflatable sealing gasket 38 at the lower end of the plenum 22*c*. Thus, with the vacuum system 24 vertically positioned with respect to mouth of the drum 40*b*, by means of the arms 55 and 56 of the fork lift 57, so as to provide the space S with the gasket 38 deflated, the drum 40*b* is positioned under the vacuum head bottom chamber or plenum 22*c*, as previously described, and the steps of filling, removing and replacing the drum 40*b* are as described in connection with FIGS. 1–3.

Alternatively, instead of deflating and inflating the gasket 38 for sealing purposes, the gasket 38 may be kept inflated, and the sealing and unsealing of the vacuum system 24 with respect to a drum, e.g. the drum 40*b*, may be accomplished by lowering and raising the vacuum system 24 with respect to the mouth of the drum by means of the fork lift 57. In this way, apparatus and controls for intermittently deflating and inflating the gasket 38 may be eliminated, the gasket 38 remaining inflated after its initial inflation.

FIG. 7 shows another embodiment of the invention which is similar to the embodiment shown in FIG. 4 except for the following:

(1) The shape of the plenum 22*d* is different from the shape of the plenum 22*c* and the plenum 22*d* has three vacuum inlets, only two of which, 74 and 75, are shown in FIGS. 7 and 8;

(2) The drum 40*b* is resting on the legs of the fork lift 57 which have a lateral spacing less than the diameter of the drum 40*b*; and (3) The inflatable gasket 38 is replaced by a non-inflatable, foam rubber gasket 76 (see FIG. 8).

In the embodiment shown in FIG. 7, there are three vacuum inlets, such as 74 and 75, but depending upon the vacuum which can be produced and the vacuum required, the number of inlets may be more or less.

Furthermore, when there are multiple inlets and a fewer number of vacuum hoses are required, the inlets not needed can be blocked.

Since a transition piece of metal between the hoses 21 and 21*a* and the inlets 74 and 75 is subject to deterioration by impact of the particles therewith, it is preferred that the transition piece 77, having an internal surface which increases in diameter from the hose 21 or 21*a* to the inlet 74 or 75, be made of a high impact plastic and be easily replaceable. Thus, the transition piece 77 of plastic has a force fit with both the inlet, 74 or 75, and with the respective hoses 21 and 21*a*.

For purposes of centering the plenum 22*d* with respect to the mouth of the drum 40*b*, the plenum 22*d* has an extension 78 which is received within the mouth of the drum 40*b*.

In the embodiment shown in FIG. 7, the sealing of the drum 40*b*, depositing of particles and removal of the drum can be the same as the alternative operation described in connection with FIG. 4. Thus, the inflated gasket 38 is replaced by a non-inflatable gasket 76, and the desired spacings and sealing of the plenum 22*d* with the drum 40 are obtained by raising and lowering of the vacuum assembly 24 by means of the fork lift 57.

As will be appreciated from a consideration of some of the embodiments shown and described in connection with FIGS. 4–8, there is relative vertical movement between the vacuum system 24 and the container 40*b* during the sealing and unsealing of the vacuum head to the container 40*b*. Although in the specific embodiments disclosed, the vacuum system 24 is vertically moved while the container 40*b* is held vertically stationary, it will be apparent that for performing the sealing and unsealing, the vacuum system 24 may be held stationary and the container 40*b* may be moved vertically such as by mounting the container 40*b* on a vertically movable platform which can be moved vertically in the same manner as the arms 55 and 56.

In the embodiment shown in FIGS. 7 and 8, the sealing between the cover 49 and the extension 78 may be sufficient to retain the cover 49 against the extension 78, but if not, a gasket may be secured to the cover 49 for engagement with the extension 78. Alternatively, the cover 49 may be shaped so as to engage a radially inward portion of the gasket 76.

Thus has been described a method and apparatus for vacuum collecting and packaging hazardous particulate material, such as radiation-contaminated concrete dust, which is safe and convenient and achieves all of the objects of the invention.

What is claimed is:

1. A vacuum collecting and packaging system for collecting and packaging particulate material as it is generated, comprising a container having predetermined height and an upwardly facing open mouth rim for receiving and packaging said material, a mobile scabbling vehicle having a vehicle body and a scabbling head mounted thereon for generating said material, a vacuum head mounted on said vehicle body and having a downwardly facing particulate material outlet spaced above said vehicle body, a vacuum line between said scabbling head and said vacuum head for collecting said generated material, a horizontally slidable bed mounted on said vehicle body beneath said particulate material outlet for positioning said container thereunder, said slidable bed being spaced a distance below said material outlet to provide a narrow spacing between said container mouth rim and said material outlet when said container is so positioned, and an inflatable sealing gasket attached to and defining the periphery of said material outlet, said sealing gasket being inflatable into sealing engagement with said container mouth rim when so positioned.

2. A vacuum collecting and packaging system according to claim 1, which further comprises a lid for said container open mouth, and a flat and thin cover for covering said material-outlet, said narrow spacing distance between said container mouth rim and said material-outlet being greater than the combined thicknesses of said container lid and said material-outlet cover for concurrently moving both said lid and said cover into said spacing from the periphery thereof.

3. A vacuum collecting and packaging system according to claim 2 wherein said cover has an opening which is small relative to the surface area of said cover for permitting air to flow through said opening of said vacuum head.

4. Apparatus for collecting and packaging particulate material in a container having predetermined height and an upwardly facing open mouth rim, comprising means providing a supporting surface for said container, a vacuum head mounted above said container supporting surface and having a downwardly facing particulate material-outlet corresponding in size and shape to that of said container mouth rim and spaced above said container supporting surface a distance greater than said container height to provide a narrow vertical peripheral spacing between said material-outlet and said container mouth rim when said container is positioned therebelow on said container supporting surface, a vacuum line for collecting said particulate material and discharging the collected material through said material-outlet, and an inflatable sealing gasket attached to and along the periphery of said material-outlet, said sealing gasket being inflatable into sealing engagement with said container mouth rim when said container is so positioned.

5. A vacuum apparatus for collecting and packaging particulate material in a container having predetermined height and being imperforate except for an upwardly facing open mouth with a peripheral rim for receiving and packaging said material, a vacuum head having downwardly facing particulate material-outlet opening to the atmosphere and of a size engageable with said peripheral rim in vacuum-tight relationship, the space below said material-outlet being free of a vacuum tight enclosure for enclosing said container, a vacuum line connected to said vacuum head above said particulate material-outlet for collecting said particulate material and for delivering said particulate material into said vacuum head above said material-outlet, whereby particulate material received in said head drops through said outlet into said container, and vertically movable supporting means for supporting one of said vacuum head and said container with said vacuum head above said container and said outlet aligned with said mouth of said container for engaging said outlet with said mouth.

6. Apparatus in accordance with claim 5 wherein said vacuum head has a sealing gasket at said outlet engageable with said mouth of said container for providing a vacuum seal therebetween.

7. A vacuum apparatus for collecting and packaging particulate material in a container having predetermined height and an upwardly facing open mouth with a peripheral rim for receiving and packaging said material, a vacuum head having a downwardly facing particular material-outlet, said vacuum head having a sealing gasket at said outlet engageable with said mouth of said container for providing a vacuum seal therebetween, a vacuum line connected to said vacuum head for collecting said particulate material, and vertically movable supporting means secured to said vacuum head for supporting and moving said vacuum head with said vacuum head above said container and said outlet aligned with said mouth of said container for engaging said outlet with said mouth.

8. Apparatus in accordance with claim 7 wherein said vertically movable supporting means is mounted on a horizontally movable vehicle.

9. A vacuum apparatus for collecting and packaging particulate material in a container having predetermined height and an upwardly facing open mouth with a peripheral rim for receiving and packaging said material, a vacuum head having a downwardly facing particulate material-outlet, a vacuum line connected to said vacuum head for collecting said particulate material, vertically movable supporting means for supporting one of said vacuum head and said container with said vacuum head above said container and said outlet aligned with said mouth of said container for engaging said outlet with said mouth, and a cover for said material outlet, said cover having an opening which is small relative to the surface area of said cover for permitting air to flow through said opening into said vacuum head.

* * * * *

UNITED STATES PATENT AND TRADEMARK OFFICE
CERTIFICATE OF CORRECTION

PATENT NO. : 5,037,159

DATED : August 6, 1991

INVENTOR(S) : Nutter et al

It is certified that error appears in the above-identified patent and that said Letters Patent is hereby corrected as shown below:

Col. 2, line 28 , after "embodiment" insert comma --,--.

Col. 11, line 37, after "convenient" insert comma --,--.

Col. 12, line 32, after "having" insert --a--.

line 56, "ular" should read --ulate--.

Signed and Sealed this

Eighteenth Day of May, 1993

Attest:

MICHAEL K. KIRK

*Attesting Officer*

*Acting Commissioner of Patents and Trademarks*